Patented June 11, 1940

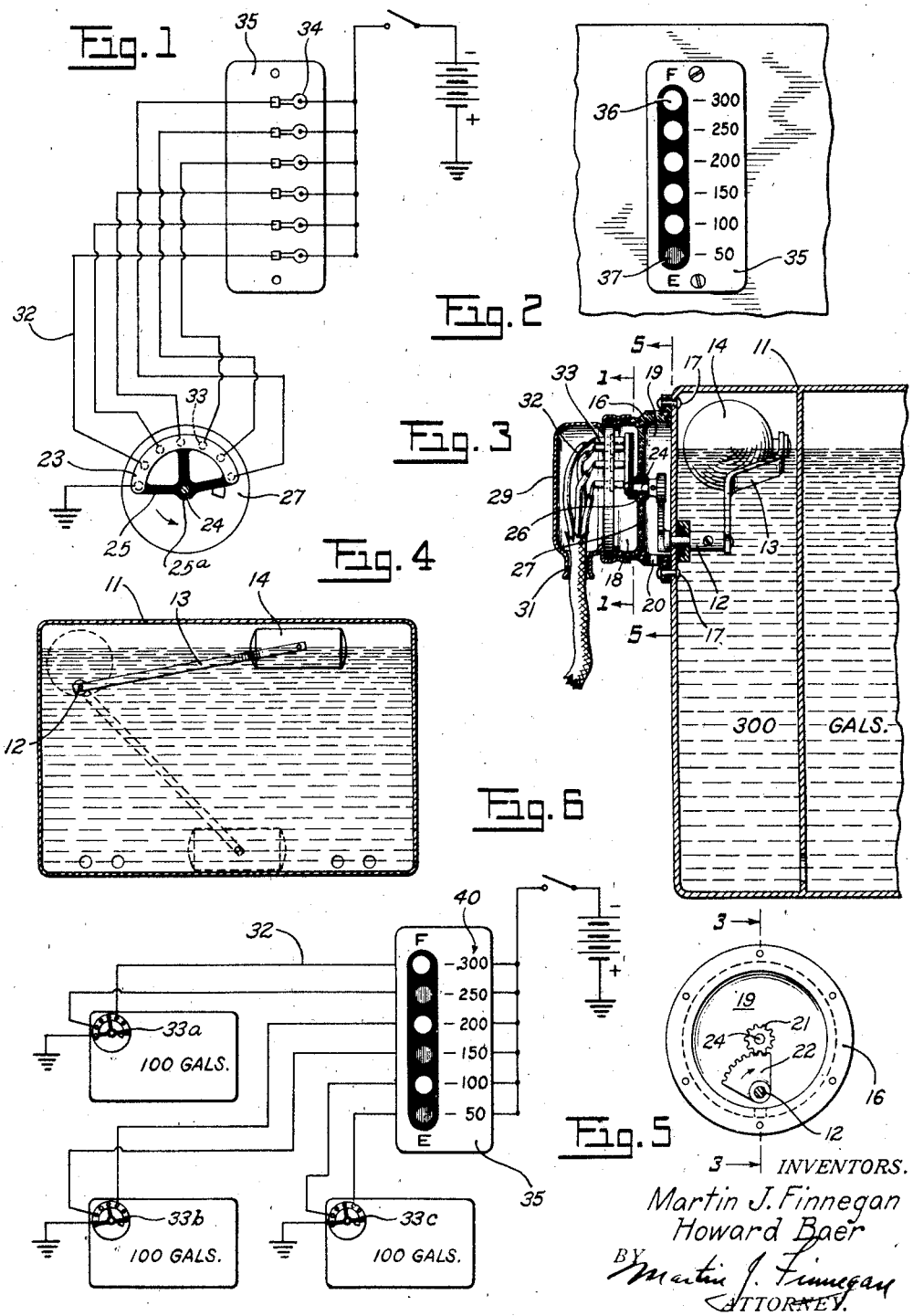

2,203,766

UNITED STATES PATENT OFFICE 2,203,766

MEASURING INSTRUMENT

Howard Baer, Jersey City, N. J., and Martin J. Finnegan, New York, N. Y., assignors to Eclipse Aviation Corporation, East Orange, N. J., a corporation of New Jersey Application June 9, 1936, Serial No. 84,360

2 Claims. (Cl. 73—313)

This invention relates to measuring instruments and particularly to instruments for measuring the liquid contents of a tank, whether buried underground, as in DeGiers Patent No. 1,875,803 of September 6, 1932, or carried by a dirigible, boat, aeroplane or other craft.

The general object of the invention is to improve upon the DeGiers and other known means for clearly indicating the amount of liquid in a tank or similar liquid holding receptacle.

The specific objects include the provision of means for indicating on a single indicating element, the amount of liquid in a plurality of tanks, or compartments, from which liquid can be drawn only in a predetermined sequence.

A second specific object is the provision of an improved construction for the tank end of the instrument which shall permit the use of a current carrying commutator, while at the same time avoiding any fire hazard, the latter being insured against by virtue of the means employed for rendering the commutator compartment immune from infiltration of combustible liquid.

A further object relates to the indicated method and means for causing the contents of the tanks to be discharged to the point of consumption in a predetermined sequence, as above suggested.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 1 is a diagrammatic representation of the electrical parts entering into one embodiment of the invention;

Fig. 2 is a view of the indicating panel;

Fig. 3 shows a circuit actuating mechanism installed in and annexed to the tank whose contents are to be measured;

Fig. 4 is a view indicating the action of the float;

Fig. 5 is a view along the line 5—5 of Fig. 3;

Fig. 6 indicates how the invention may be applied to measure the contents of a series of tanks;

Fig. 7 is a diagrammatic view of the parts entering into a second embodiment of the invention; and Fig. 8 is a sectional view of one of the three similarly constructed valves shown in Fig. 7.

Referring first to Figs. 1 to 5, reference character 11 indicates a liquid receptacle having an outer wall apertured to receive a rockshaft 12, to the inner end of which is attached an arm 13 carrying a float 14, the outer end of the rockshaft being confined within a housing 16 secured to the tank 11 by suitable means 17, and divided into two chambers 18 and 19, the former being a commutator receiving chamber and the latter serving to house the pinion 21 and sector 22 functioning to transmit motion of rockshaft 12 to the arcuate current conducting strip 23 which is movable with the pinion shaft 24 by reason of the intervening spokes 25 which carry said conducting strip 23, said spokes being disposed radially of a hub 25a keyed to shaft 24 to oscillate therewith. As indicated, spokes 25 and hub 25a are of insulating material, to prevent passage of current from brush terminals 33 to pinion shaft 24.

Pinion shaft 24 has bearing upon the boss 26 of partition 27 dividing the gear housing 19 from the commutator housing 18. Detachably secured to housing 18 is a cover plate 29 having an opening 31 to receive leads 32 connecting brush terminals 33 with the indicator terminals 34 on the rear of panel 35, the face of the panel having windows 36 illuminated by the light of the individual lamps when the respective circuits thereto are closed, and successively darkened as the downwardly moving float, responding to the lowering of the liquid level, causes commutator 23 to successively open the said circuits.

In the systems of Figs. 6 and 7, involving the use of two or more tanks in series, the individual commutators 33a, 33b and 33c are all wired to a common panel having scale markings 40 covering the range from all tanks being full, to all tanks being empty; it being understood that the contents of the tanks will be utilized in a predetermined sequence. It is to be understood that the number of scale markings may be increased, and the number of indicating lamps and conductors correspondingly increased. Thus, for example, each terminal on commutators 33a, 33b and 33c may receive a conductor, and each of these conductors may receive a signal lamp, as in the case of conductors 32 in Fig. 1.

Figure 7 indicates one means for providing, automatically, for such a predetermined sequence. As shown this means includes three discharge conduits 41, 42, 43 having a junction fitting 44 with an outlet conduit 45 leading to the point of consumption—an engine carburetor, for example—and a valve in each conduit corresponding to that shown in section in Fig. 8, said valves being operated in the sequence determined by the means for interconnecting the windings 51, 52, 53, so as to render any certain one of them energizable only when the commutator of the preceding tank, in the predetermined sequence, has moved to a position corresponding to the evacuated condition of the associated tank. Thus, as shown, solenoid 52 can be energized only when commutator 33a has moved around to engage contact 61, thereby completing a circuit from source 62 to the solenoid 52 by way of switch 64 (adapted to be closed manually to initiate operation) conductors 63, 65 and 66, and back to the source by way of conductors 67, 61, 33a, and ground 68.

Energization of solenoid 52, thus produced, attracts its magnetizable core 71 (Fig. 8) with its valve gate 72, thereby lifting the said gate to permit flow along pipe 42, through port 73, to the outlet 45. An emergency by-pass 74 permits flow in response to manual opening of valve 76, through turning of handle 77, such turning causing the valve sleeve 78 to thread itself back along screw 79, thereby connecting by-pass 74 with outlet 42. A spring 81 normally holds valve gate 72 closed, the pressure thereof being regulable by operation of screw 82.

As illustrated in Fig. 3, to prevent seepage of the liquid into housing 18, I provide a drain aperture 20 in housing 16, at a point lower than the bearing 26 for pinion shaft 24. In this way the danger of ignition of the liquid (if combustible) by a spark or heat in the commutator chamber 18 is minimized.

In the appended claims the expression "series of tanks" is to be construed as covering separate tanks, or separate compartments in a single "tank."

What is claimed is:

1. In combination with a series of tanks, each having a float therein, a series of circuit controllers each movable with one of said floats, circuits connecting with each of said circuit controllers, an indicator having a series of indicating elements, one for each of said circuits, operable in sequence as said circuits are operated sequentially by said circuit controllers in response to descent, in sequence, of said floats, and means controlled by said circuit controllers for insuring the emptying in sequence of the tanks containing said floats, whereby said floats are caused to operate said circuit controllers in sequence and thereby produce operation of said indicating elements in corresponding sequence.

2. In combination with a series of tanks adapted to contain a liquid, a series of circuit controllers, each movable in accordance with the extent of variation in the level of the liquid in one of said tanks, circuits connecting with each of said circuit controllers, an indicator having a series of indicating elements, one for each of said circuits, operable in sequence as the said circuits are operated sequentially by said circuit controllers in response to such liquid level variation in said tanks in sequence, and means controlled by said circuit controllers for insuring the emptying in sequence of said tanks, whereby said circuit controllers are operated in sequence to produce operation of said indicating elements in corresponding sequence.

HOWARD BAER.
MARTIN J. FINNEGAN.